United States Patent
Mindl et al.

(10) Patent No.: US 6,714,119 B1
(45) Date of Patent: Mar. 30, 2004

(54) KEYLESS ACCESS CONTROL DEVICE FOR MOTOR VEHICLES AND METHOD FOR CARRYING OUT A KEYLESS ACCESS AUTHORIZATION CONTROL IN MOTOR VEHICLES

(75) Inventors: Anton Mindl, Lüdenscheid (DE); Detlef Kerkmann, Nachrodt (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/857,667
(22) PCT Filed: Jan. 12, 2000
(86) PCT No.: PCT/EP00/00158
§ 371 (c)(1), (2), (4) Date: Jun. 7, 2001
(87) PCT Pub. No.: WO00/43622
PCT Pub. Date: Jul. 27, 2000

(30) Foreign Application Priority Data

Jan. 25, 1999 (DE) .......................... 199 02 797

(51) Int. Cl.⁷ .............................................. G05B 23/00
(52) U.S. Cl. ........................ 340/5.72; 340/5.61; 70/278
(58) Field of Search ........................ 340/5.2, 5.6, 5.72, 340/5.62, 5.5, 10.3, 10.33, 825.69, 825.72, 10.1; 307/10.1; 235/282.5, 382; 70/278

(56) References Cited

U.S. PATENT DOCUMENTS 5,844,470 A * 12/1998 Garnault et al. ............ 340/426
6,062,614 A * 5/2000 Petzold ..................... 292/336.3
6,538,560 B1 * 3/2003 Stobbe et al. .............. 340/5.72

FOREIGN PATENT DOCUMENTS

| DE | 4329697 | 3/1995 |
| DE | 4342467 | 6/1995 |
| DE | 19728761 | 9/1998 |
| EP | 0218251 | 4/1987 |
| EP | 0589158 | 3/1994 |
| EP | 0831194 | 3/1998 |

* cited by examiner

Primary Examiner—Brian Zimmerman
Assistant Examiner—M Shimizu
(74) Attorney, Agent, or Firm—Brooks Kushman P.C.

(57) ABSTRACT

A keyless access control device and method for a motor vehicle includes a controller, transceiver, and a mobile transponder. The transceiver transmits a low frequency signal (LF) to the transponder and, in response, the transponder transmits a first high frequency (HF) signal to the transceiver. The controller moves a vehicle door handle into a position in which the door handle can be actuated by a user in response to receipt of the first HF signal by the transponder. The transceiver transmits a second HF signal to the transponder in response to actuation of the door handle by the user. The transponder transmits an encrypted HF signal to the transceiver based on the second HF signal. The transceiver processes the encrypted HF signal to determine whether the user is authorized to enter the vehicle. The controller unlocks the vehicle door in response to the transceiver indicating that the user is authorized.

4 Claims, 2 Drawing Sheets

KEYLESS ACCESS CONTROL DEVICE FOR MOTOR VEHICLES AND METHOD FOR CARRYING OUT A KEYLESS ACCESS AUTHORIZATION CONTROL IN MOTOR VEHICLES

TECHNICAL FIELD

1. Field of the Invention

The invention is based on a sensor device for detecting a physical measured variable with an output reporting the measured variable as coded signal in digital or analog form.

The invention concerns the field of keyless access control devices. In particular, the invention concerns a keyless access control device for motor vehicles with a transceiver unit allocated to the motor vehicle, and a mobile transponder. The transceiver contains at least one transmitter (LF transmitter) operating in the inductive frequency range for transmitting a low-frequency code signal (LF signal), and a transceiver unit operating in the high-frequency range (HF range). The transponder contains a receiver for receiving the LF signal and an HF transceiver unit. The HF transceiver units are provided to conduct a bi-directional dialogue that checks access authorization. Moreover, the invention concerns a procedure to carry out keyless access authorization control in motor vehicles.

2. Background Art

A similar device and a similar procedure are known from the articles "Ein Fahrzeugsicherungssystem ohne mechanischen Schlüssel" [A motor vehicle safety system without a mechanical key] by Ch. Schneider and U. Schrey, published in "Automobiltechnische Zeitschrift 96" (1994) No. 5, and "Smart-Card—Abschied vom Autoschlüssel" [Smart-Card—Goodby to the car key] by U. Schrey, Ch. Schneider, and M. Siedentrop, published in "Siemens-Zeitschrift 1/96." The access control device described in these documents basically consists of a vehicle-assigned transceiver device and a mobile transponder. The transceiver device comprises three transmitters (LF transmitters) operating in the inductive frequency range, with one transceiver being assigned to the driver's door, another transceiver being assigned to the front passenger-side door, and the third transceiver being assigned to the rear of the vehicle. The transmitting antennas of the LF transmitters are integrated into the corresponding side doors and the rear bumper, respectively. Each LF transmitter is connected to the respective door-handles and the trunk release in such a way that, when any one of these is actuated, the LF transmitter assigned to the corresponding section of the vehicle will emit a low-frequency code signal (LF signal). The remaining LF transmitters, however, remain dormant and do not emit LF signals.

Moreover, the vehicle-assigned transceiver unit is equipped with an HF receiver to receive HF signals from the transponder. The response signal from the transponder that is received by the HF receiver actuates a processor-equipped control device in order to decode and check the validity of the received response signal, which is received as an encrypted code. With conformity established, a matching control signal is sent to the respective door latch mechanisms in order to unlock the corresponding doors with handles that had been previously actuated.

A so-called access card is provided as a transponder containing a LF receiver and a low-power HF transmitter. The inductive reception antenna is in the form of a loop antenna, and the high-frequency transmitting antenna is in the form of a circuit board antenna. The LF signal received by the LF receiver of the transponder is decoded in the transponder. Subsequently, a microprocessor assigned to the transponder evaluates the codeword contained in the LF signal with a security algorithm and transfers the result via the HF transmitter unit to the HF receiver of the vehicle-assigned transceiver unit.

By transmitting LF signals to "waken" the transponder, the functional range is limited due to the rapidly diminishing magnetic field. Reception of the transmitted LF signal is possible only within a functional range of 1.5 to 2 meters. Thus it is guaranteed that only those transponders located within this close range are woken by the operated LF transmitter. The necessary actuation of a door handle or trunk latch and the limitation of the functional range allow unequivocal locating of the transponder or the person carrying the transponder.

In order to unlock the respective door of the vehicle as quickly as possible, modified door handle and locking mechanisms are used which allow immediate unlocking and opening of the door whose handle has been actuated. Even by means of such mechanisms, it is not possible to shorten the time needed to transport the data sent from the LF transmitter to the transponder. This applies especially when encrypted codes with a complicated structure are to be transmitted, because this requires a certain amount of time due to the low data transfer speed. However, the transmission of the decoded response signal from the transponder to the HF receiver only slightly delays the start of the unlocking process of the doors.

Another keyless access control device for motor vehicles is known from DE 43 29 697 C2. This device uses a central LF transmitter to emit the low-frequency code signal. However, this device is designed such that the LF transmitter emits LF signals cyclically at certain intervals. The vehicle-related transponder is woken only when it is located within the functional range of the LF transmitter. This device operates without requiring the actuation of a door handle or trunk latch. However, since it is not possible to locate a transponder for the unlocking of selected doors according to this device, this access control device is applicable only to motor vehicles featuring a centrally controlled locking system. Also this anticipated access control device sometimes implies delayed unlocking due to the transfer duration of the LP signal that may possess a complicated structure.

Moreover, a keyless access control device is described in DE 197 28 761 C1, which also features several LF transmitters that are assigned to certain sections of the vehicle, and each of these transmitters emit its own unique signal that is different from that of the other LF transmitters. The mobile transponder, comprising a LF receiver as well as an HF transceiver unit, is woken by one of the LF transmitters and subsequently enters into a question-and-answer dialogue with the vehicle-assigned transceiver unit, wherein access authorization is checked and after successful completion, the respective door of the vehicle is unlocked.

This device has the advantage that door handles do not have to be actuated in order to commence communication between vehicle and transponder, and therefore, there is no noticeable delay between actuation of the handle and unlocking of the door. However, this advantage is balanced by the disadvantage that the door(s) may be unlocked unintentionally, when the authorized user is standing or moving near the vehicle.

SUMMARY OF THE INVENTION

Starting from the state of the art discussed above, the invention therefore concerns the task of proposing a keyless access control device for motor vehicles as well as a procedure for performing keyless access authorization control in motor vehicles that is capable not only of unlocking individual doors or trunks, wherein an exchange of code and response signals with complicated structures is allowed without a noticeable delay of the unlocking process, but that also effectively prevents unintentional unlocking of the vehicle's doors.

This task is solved first in that the access control device comprises a control unit that co-operates with at least one vehicle-assigned operating element, wherein, by means of a first HF signal emitted by the transponder after receiving the LF signal, the control unit is set to a state in which the at least one operating element can be actuated by the vehicle's user and the control unit is connected to an electrical switch that is assigned mechanically to the operating element, and electrically to the control unit.

Moreover, according to the invention, this task is solved by a procedure for performing keyless access authorization control in motor vehicles, encompassing the following steps:

- emission of coded LF signals in the inductive frequency range from at least one vehicle-assigned LF transmitter
- starting of a vehicle-assigned HF transceiver unit
- reception and identification of the LF signal with a transponder
- starting of a transponder-assigned HF transceiver unit
- emission of a coded HF response signal by the transponder
- reception and identification of the HF response signal by the vehicle-assigned transceiver unit
- releasing of the switches assigned electrically to the vehicle's control device, and of the operating elements assigned mechanically to the switches
- actuation of at least one of the operating elements by the user
- conduction of a bi-directional question-and-answer dialogue over the HF distance between the vehicle-assigned transceiver unit and that of the transponder; wherein this dialogue includes the emission of an encrypted code from the transponder to the vehicle-assigned HF transceiver unit
- identification of the encrypted code by the transceiver unit, and
- opening of one or more door latches corresponding to the door(s) to which the actuated operating element is assigned.

The LF signal emitted from the vehicle is only used to "wake up" the transponder when the authorized user approaches his vehicle. The first coded HF response signal, emitted subsequently by the transceiver unit of the transponder, is used as a preliminary, low-level security verification of user authorization, leading to the release of the switches assigned to the vehicle's control device, and of the operating elements assigned mechanically to the switches.

Just the actuation of one of these operating elements triggers the proper question-and-answer dialogue, conducted at a high-level safety standard, between the vehicle-assigned transceiver unit and the transponder. This is conducted over an HF distance, with both the transceiver device inside the motor vehicle and the transponder featuring an HF transceiver unit. By using an HF distance to transmit the essential signals meant for identification, it becomes possible to also exchange encrypted codes with complicated structures between both units without causing delays in the unlocking mechanism that are noticeable to the user. This measure considerably enhances system security. This is also further enhanced by the fact that the question-and-answer dialogue over the HF distance is conducted only after the user who has been identified by the preceding rough verification as presumably authorized, has expressed his intention of opening the vehicle by actuating the door handle. This action by the user simultaneously identifies the door to be opened, as long as no other unlocking-mode has been selected, e.g. central unlocking.

After the successful preliminary identification of the presumably authorized user, the realization of the operation status of the control device, which is encompassed by the access control device, which features at least one operating element that can be actuated by the user of the motor vehicle, and which interacts with an electrical switch that is assigned mechanically to the operating element and electrically to the control device, can be effected by different mechanical and/or electrical measures.

For example, it can be realized by the interaction between at least one of the operating elements, preferably a door handle of the vehicle, and the electrical switch assigned to it mechanically, by a mechanical link that can be moved between at least two positions: "interaction on" and "interaction off."

Alternatively, however, prior to the preliminary identification the movement of the operating element can be mechanically blocked or prevented by a movable cover.

Moreover, electromotor drives are preferably used to move the mechanical elements to one of the possible positions. These mechanical elements actuate, block and/or cover at least one operating element.

As an electrical measure, e.g., an operating voltage is applied to the switch assigned to the control device, which is inactive prior to the preliminary identification.

BRIEF DESCRIPTION OF THE DRAWINGS

Further advantages of the invention emerge from the following description of a preferred embodiment. Shown are.

DETAILED DESCRIPTION OF THE PREFERRED EMBODIMENT(S)

Figure 1:
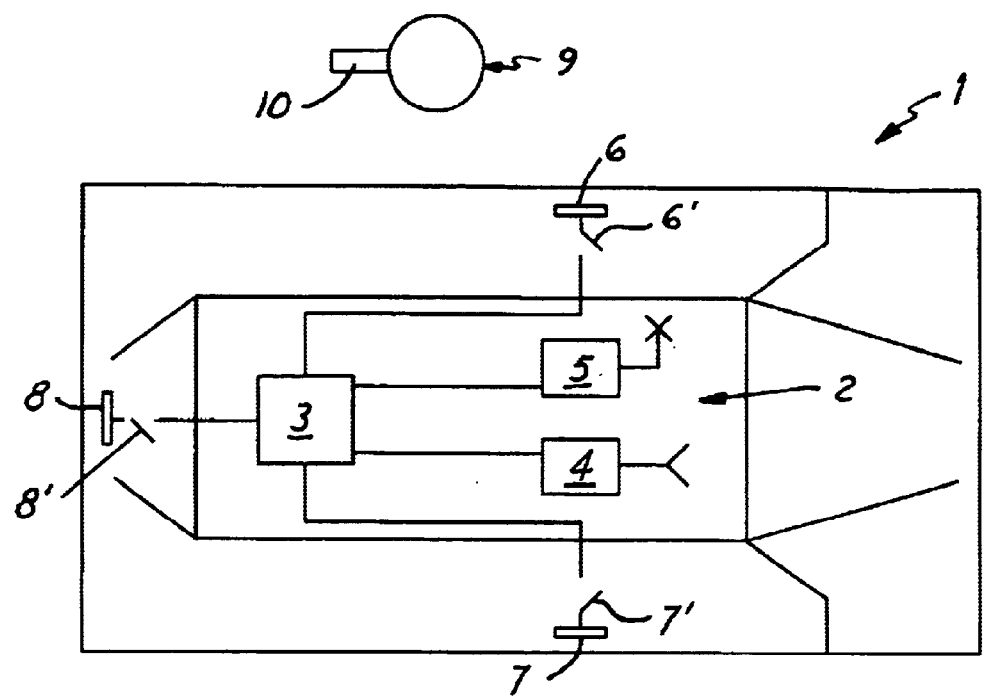
FIG. 1, a schematic presentation of a keyless access control device for motor vehicles, FIG. 2, a flow chart of a question-and-answer dialogue for access authorization between a motor vehicle-assigned transceiver unit and a mobile transponder.

FIG. 1 presents a schematic view of a motor vehicle 1 equipped with a keyless access control device. The access control device consists of a control device 3 that is assigned to motor vehicle 1 and that is connected to a transceiver unit 2, as well as electrical switches 6', 7', 8' that are connected by means of respective wires to door handles 6, 7, 8. Transceiver unit 2 comprises at least one transmitter operating in the inductive frequency range (LF transmitter) 4, as well as an HF transceiver unit 5. LF transmitter 4 emits LF code signals, preferably on a frequency between 1 and 25 kHz. By shaping the antenna accordingly, it is possible to use almost exclusively the magnetic component of the electromagnetic waves. In said frequency range this component is hardly attenuated by either the vehicle's chassis or the human body. The intensity of the LF signal is reduced in such a way that the functional range is limited to only a few meters.

Transceiver unit 5 is used to receive an HF response signal and to conduct a question-and-answer dialogue with transponder 9. Transponder 9 comprises a LF receiver whose antenna is a ferrite core antenna 10. The LF receiver will receive LF code signals from transceiver unit 2. The output of LF receiver of transponder 9 is connected to the input of a microprocessor, which, after receiving an LF signal, starts an HF transceiver unit assigned to transponder 9. For a power supply, transponder 9 contains a rechargeable battery that is not shown, e.g., a lithium-ion battery.

Figure 2:
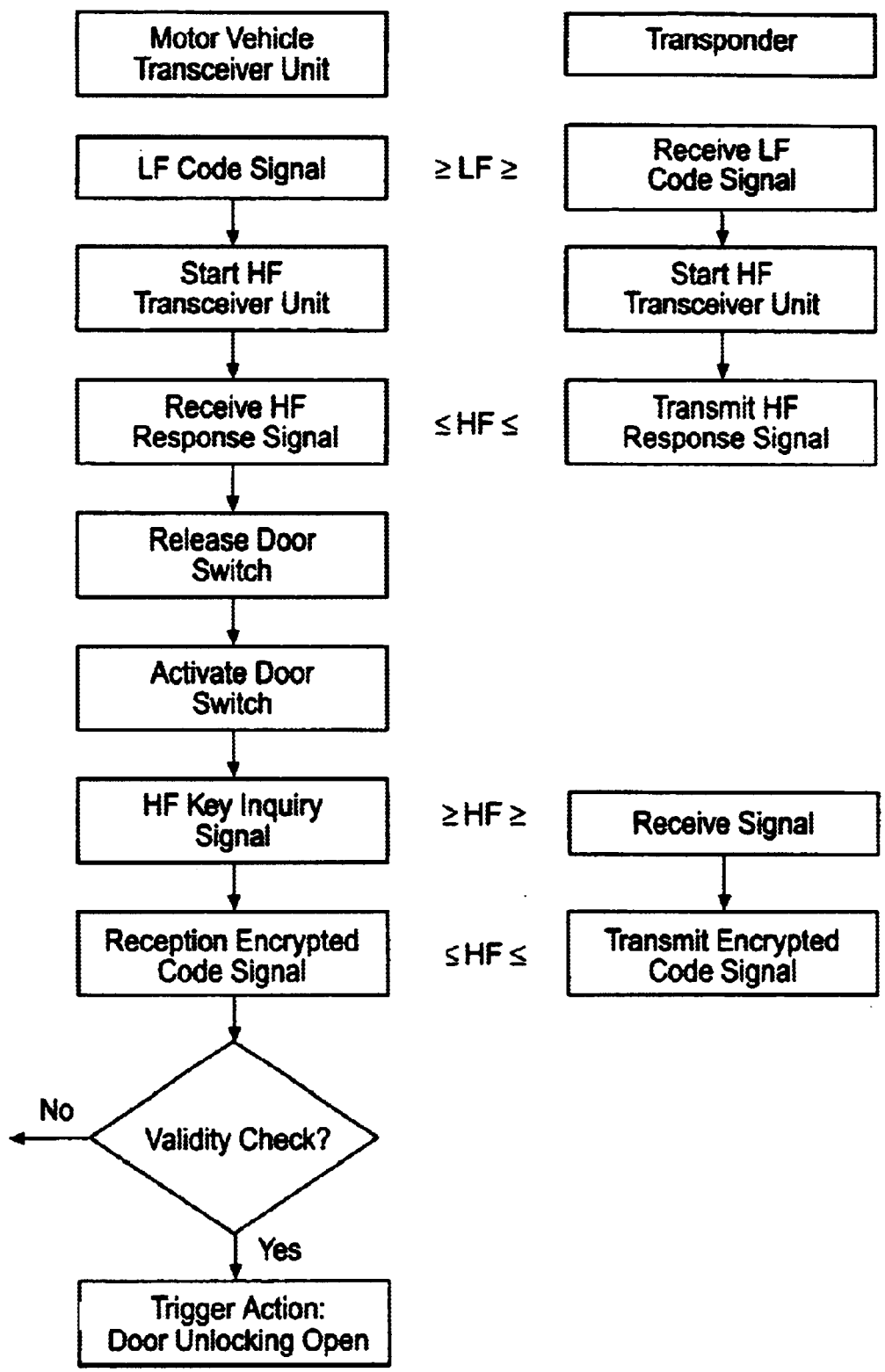

A keyless access authorization control according to the access control device shown in FIG. 1 works as follows, with reference to the flow chart in FIG. 2:

LF transmitter 4 emits a coded LF signal, which is received by transponder 9 when the transmitter approaches motor vehicle 1, e.g., in the jacket pocket of an authorized person, and which is meant to "wake" transponder 9.

Transponder 9 recognizes the LF code signal, starts the HF transceiver unit assigned to it and emits a coded HF response signal.

Simultaneously with the cyclical emission of the LF code signal, HF transceiver unit 5 of transceiver unit 2, located inside motor vehicle 1, is started. The coded HF response signal emitted by transponder 9 is received by HF transceiver unit 5 in motor vehicle 1. The received code is checked and, in the case of a positive result, electrical switches 6', 7', 8' and corresponding door handles 6, 7, 8 are released by control device 3. The release may be effected, e.g., by retracting covers that have so far concealed door handles 6, 7, 8 in order to now make them accessible to the user, or by only now connecting door handles 6, 7, 8 mechanically with assigned electrical switches 6', 7', 8', or by freeing the handles from blocking devices preventing their movement.

The user's actuation of one of the door handles triggers the bi-directional question-and-answer dialogue over the HF distance between HF transceiver unit 5 in the motor vehicle and that of transponder 9 in order to check the validity of access authorization. In this process, the response signal received by HF transceiver unit 5 from transponder 9 is decoded and matched against a reference variable or several reference variables, whereupon the access authorization of the person carrying the transponder is established. In this embodiment, upon reception of a valid response-code signal, control device 3 issues a release signal to unlock the vehicle door, with the handle that has been actuated.

In a suitable place, motor vehicle 1 has a transponder receptacle, into which transponder 9 with its ferrite core antenna 10 can be inserted. Assigned to this transponder receptacle is an inductive charging device, so that the rechargeable battery of transponder 9 is recharged when motor vehicle 1 is used. Moreover, another device is assigned to the transponder receptacle, and this device performs question-and-answer dialogues which follow the pattern of the question-and-answer dialogue described above, but these dialogues have the purpose of disarming an immobilizing system and/or at starting or checking other security or operation modes.

What is claimed is:

1. A keyless access control device for a motor vehicle, the motor vehicle having a locked door and a door handle movable between first and second states, wherein in the first state the door handle is enabled to be actuated by a motor vehicle user in order to open the door when the door is unlocked, and in the second state the door handle is disabled from being actuated by a motor vehicle user, the device comprising:

a controller associated with the motor vehicle and operable for moving the door handle between the first and second states, the controller further operable for unlocking the door;

a transceiver associated with the motor vehicle, the transceiver operable for transmitting a low frequency (LF) code signal and for transmitting and receiving high frequency (HF) code signals; and a transponder associated with the motor vehicle user, the transponder operable for receiving an LF code signal and for transmitting and receiving HF code signals;

wherein the transceiver transmits an LF code signal to the transponder and, in response, the transponder transmits a first HF code signal to the transceiver for low-level verification that the motor vehicle user has authorization to enter into the motor vehicle;

wherein the controller moves the door handle from the second state in which the door handle is disabled from being actuated by a motor vehicle user to the first state in which the door handle is enabled to be actuated by the motor vehicle user in response to receipt and identification of the first HF code signal by the transceiver;

wherein the transceiver transmits a transponder inquiry HF code signal to the transponder in response to actuation of the door handle by the motor vehicle user;

wherein the transponder processes the transponder inquiry HF code signal to generate an encrypted HF code signal, wherein the transponder transmits the encrypted HF code signal to the transceiver for high-level verification that the motor vehicle user has authorization to enter into the motor vehicle;

wherein the transceiver processes the encrypted HF code signal in order to determine whether the transponder is authorized to enable motor vehicle user entry into the motor vehicle;

wherein the controller unlocks the door while the motor vehicle user is actuating the door handle in response to the transceiver indicating that the motor vehicle user is authorized to enter into the motor vehicle.

2. The device of claim 1 wherein:

the door handle has a movable mechanical cover which prevents actuation by the motor vehicle user when the door handle is in the second state and enables actuation by the motor vehicle user when the door handle is in the first state.

3. A keyless access control method for a motor vehicle, the motor vehicle having a locked door and a door handle movable between first and second states, wherein in the first state the door handle is enabled to be actuated by a motor vehicle user in order to open the door when the door is unlocked, and in the second state the door handle is disabled from being actuated by a motor vehicle user, the method comprising:

transmitting a low frequency (LF) code signal from a transceiver associated with the motor vehicle to a transponder associated with the motor vehicle user;

transmitting a first high frequency (HF) code signal from the transponder to the transceiver in response to receipt of the LF code signal for low-level verification that the motor vehicle user has authorization to enter into the motor vehicle;

moving the door handle from the second state in which the door handle is disabled from being actuated by a motor vehicle user to the first state in which the door handle is enabled to be actuated by the motor vehicle user in response to receipt and identification of the first HF code signal by the transceiver;

transmitting a transponder inquiry HF code signal from the transceiver to the transponder in response to receipt of the first HF code signal and actuation of the door handle by the motor vehicle user;

processing the transponder inquiry HF code signal with the transponder to generate an encrypted HF code signal;

transmitting the encrypted HF code signal from the transponder to the transceiver for high-level verification that the motor vehicle user has authorization to enter into the motor vehicle;

processing the encrypted HF code signal with the transceiver in order to determine whether the transponder is authorized to enable motor vehicle user entry into the motor vehicle; and unlocking the door while the motor vehicle user is actuating the door handle in response to the transceiver indicating that the motor vehicle user is authorized to enter into the motor vehicle.

4. The method of claim 3 wherein:

moving the door handle to the first state in response to receipt of the first HF code signal by the transceiver includes moving a mechanical cover associated with the door handle to a position which enables actuation of the door handle by the motor vehicle user.

* * * * *